United States Patent
Lachaume

(10) Patent No.: US 9,274,828 B2
(45) Date of Patent: Mar. 1, 2016

(54) SYSTEMS AND METHODS FOR EVENT DRIVEN OBJECT MANAGEMENT AND DISTRIBUTION AMONG MULTIPLE CLIENT APPLICATIONS

(71) Applicant: Maestrano Pty Ltd., Surry Hills, NSW (AU)

(72) Inventor: Arnaud Lachaume, Surry Hills (AU)

(73) Assignee: Maestrano Pty Ltd., Sydney, NSW (AU)

( * ) Notice: Subject to any disclaimer, the term of this patent is extended or adjusted under 35 U.S.C. 154(b) by 0 days.

(21) Appl. No.: 14/528,664

(22) Filed: Oct. 30, 2014

(65) Prior Publication Data

US 2015/0128152 A1    May 7, 2015

Related U.S. Application Data

(60) Provisional application No. 62/012,260, filed on Jun. 13, 2014.

(30) Foreign Application Priority Data

Nov. 3, 2013  (AU) .............................. 2013904250
Mar. 4, 2014  (AU) .............................. 2014900724

(51) Int. Cl.
*G06F 13/00*    (2006.01)
*G06F 9/46*    (2006.01)
(Continued)

(52) U.S. Cl.
CPC .............. *G06F 9/465* (2013.01); *G06F 9/4428* (2013.01); *G06F 9/542* (2013.01)

(58) Field of Classification Search
CPC .... G06F 9/465; G06F 9/541; G06F 17/30575
USPC .................. 719/316, 328; 707/610
See application file for complete search history.

(56) References Cited

U.S. PATENT DOCUMENTS 7,716,377 B2 *  5/2010  Harris ...................... G06F 9/52
                                                                 709/248
7,779,039 B2    8/2010  Weissman
(Continued)

FOREIGN PATENT DOCUMENTS

EP          1217545       6/2002
WO      WO 2005116892    12/2005

OTHER PUBLICATIONS

International Search Report from corresponding PCT/AU2014/001027, mailed Jan. 19, 2015.

(Continued)

*Primary Examiner* — Andy Ho
(74) *Attorney, Agent, or Firm* — Jones Day

(57) ABSTRACT

A computer implemented method for updating and distributing data objects among multiple client applications is described. The method includes receiving object data for an object from a first application instance of an application engine, wherein the object data reflects a change to a state of the object based on action of the first application instance, updating a data structure for the object in a based on the received object data, determining whether a transformation policy is applicable to the object and, if so, modifying data associated with the object according to the transformation policy, identifying application instances that should receive updated object data for the object based on stored information identifying clients that have agreed to share updated object data and based on stored information identifying types of updates that clients are to receive, and communicating updated object data to the application instances that should receive updated object data according to stored preferences associated with each of the application instances.

30 Claims, 6 Drawing Sheets

(51) Int. Cl.
*G06F 9/44* (2006.01)
*G06F 9/54* (2006.01)

(56) References Cited

U.S. PATENT DOCUMENTS

| | | | |
|---|---|---|---|
| 8,032,559 | B2 | 10/2011 | Ring et al. |
| 8,332,334 | B2 | 12/2012 | Long et al. |
| 8,364,745 | B2 | 1/2013 | Roshen |
| 2007/0162421 | A1 | 7/2007 | Pang et al. |
| 2008/0130682 | A1 | 6/2008 | Akadiri |
| 2012/0116937 | A1 | 5/2012 | Van Biljon |
| 2013/0054511 | A1 | 2/2013 | Gomadam et al. |
| 2013/0073381 | A1 | 3/2013 | Binkley |
| 2013/0159987 | A1* | 6/2013 | Shi ............... G06F 9/45558 717/170 |
| 2013/0275509 | A1 | 10/2013 | Micucci et al. |

OTHER PUBLICATIONS

International Written Opinion from corresponding PCT/AU2014/001027, mailed Jan. 19, 2015.

* cited by examiner

Example data structure 600 (data object itself is user data)

Data Model 602

Name <string>
Surname <string>
Email: <string | primary key>
DOB: <date>
Occupation: <string>
 * *
Valid From: <date>
Valid To: <date>

FIG. 6A

Object/resource 604

Name: John
Surname: Doe
Email: john.doe@corp.com
DOB: 20/04/1970
Occupation: Student
 * *
Valid From: 2008-01-10
Valid To: 2010-01-10

Object/resource 606

Name: John
Surname: Doe
Email: john.doe@corp.com
DOB: 20/04/1970
Occupation: Engineer
 * *
Valid From: 2010-01-10
Valid To: Nil (still current)

FIG. 6B

SYSTEMS AND METHODS FOR EVENT DRIVEN OBJECT MANAGEMENT AND DISTRIBUTION AMONG MULTIPLE CLIENT APPLICATIONS

The present application claims the benefit of U.S. Provisional Patent Application No. 62/012,260 filed Jun. 13, 2014, the entire contents of which are incorporated herein by reference. The present application also claims foreign priority to Australia Provisional Patent Application No. 2013904250 filed Nov. 3, 2013 and to Australia Provisional Patent Application No. 2014900724 filed Mar. 4, 2014, the entire contents of each of which are incorporated herein by reference.

COPYRIGHT STATEMENT

This document contains material which is subject to copyright protection. The copyright owner has no objection to the facsimile reproduction by anyone of the patent document or the patent disclosure as it appears in the official government patent file or records, but otherwise reserves all copyright rights.

FIELD OF THE DISCLOSURE

The present invention relates generally to the field of data processing and synchronization and, more particularly, to systems and methods for providing event based data synchronization for multiple remote computer programs.

BACKGROUND

In a computer data center, e.g., a cloud service, a suite of business applications may be provided for functions such as accounting, sales management and customer management. These applications may employ common information, such as customer names, which may be required to be entered into each application via a repetitive process. In conventional systems, when information is changed in one application, it is not seamlessly updated in other applications. Traditional enterprise ecosystems attempt to address this problem by enabling point-to-point integration and sharing of events between business applications via an archiving application and through specially developed connections between the archiving application and the business applications. The present inventors have observed that such approaches can be inefficient and can lead to inconsistencies in the data over time.

SUMMARY

Aspects of the present disclosure may address various deficiencies in the conventional art observed by the present inventors. The present disclosure relates to, among other things, a computer processing platform with a communication backbone referred to herein as an enterprise service bus (ESB), for managing the exchange and sharing of business data between applications running on a common operating platform.

According to an example, a computer implemented method for updating and distributing data objects among multiple client applications is described. The method comprises receiving at a processing platform object data for an object from a first application instance of an application engine, wherein the object data reflects a change to a state of the object based on action of the first application instance; updating a data structure for the object in a database using a processing system at the processing platform based on the received object data; determining with the processing system whether a transformation policy is applicable to the object and, if so, modifying data associated with the object with the processing system at the processing platform according to the transformation policy; identifying with the processing system application instances that should receive updated object data for the object based on stored information identifying clients that have agreed to share updated object data and based on stored information identifying types of updates that clients are to receive; and communicating updated object data to the application instances that should receive updated object data according to stored preferences associated with each the application instances.

A system comprising a processing system and a memory coupled to the processing system, wherein the processing system is configured to execute the foregoing steps is also described.

A non-transitory computer readable medium including program instructions, which when executed cause a processing system to execute the foregoing steps, is also described.

According to an example, a computer implemented system for updating and distributing data objects among multiple client applications is described. The system comprises means for receiving object data for an object from a first application instance of an application engine, wherein the object data reflects a change to a state of the object based on action of the first application instance; means for updating a data structure for the object based on the received object data; means for determining whether a transformation policy is applicable to the object and, if so, modifying data associated with the object according to the transformation policy; means for identifying application instances that should receive updated object data for the object based on stored information identifying clients that have agreed to share updated object data and based on stored information identifying types of updates that clients are to receive; and means for communicating updated object data to the application instances that should receive updated object data according to stored preferences associated with each the application instances.

According to another example, a data structure for a data object permits facilitating updates and distribution of data objects among multiple client applications in a computer network. The data structure comprising: a plurality of first data fields including a first identification field to uniquely identify an object, a second identification field to identify lineage or relatedness of the object to another object, a type field that identifies a type of the object, a first timestamp field that specifies when the object started to be valid, and a second timestamp field that specifies when the object became or is expected to become invalid; a plurality of second data fields to identify substantive data regarding a customer or a project for the object; and a plurality of third data fields that are customizable and configured in an initial state to be unallocated such that no particular type of object data is predestined to occupy the third data fields, the third data fields being dynamically reconfigurable during runtime to accommodate new data from one or more applications, wherein the third data fields are not coded according to a static data model.

DETAILED DESCRIPTION OF THE DRAWINGS

Exemplary embodiments will now be described with reference to the accompanying drawings.

FIGS. 6A and 6B illustrate further examples of certain data structures according to an aspect of the present disclosure.

DETAILED DESCRIPTION OF EXEMPLARY EMBODIMENTS

Exemplary aspects of the present disclosure are directed at solutions for enhancing the integration and coherence of information among computer-based applications, e.g., applications used by businesses and other organizations, by improving data transport and data management through use of a uniform processing platform for sharing and managing information. Instead of sharing events generated by applications via point-to-point connections between individual applications, applications can share data objects, or portions of data objects, associated with events by means of a processing platform with data management and distribution functionality and associated application connectors (e.g., built from or including application programming interfaces (API)) that provide the framework for permitting applications to communicate with the processing platform. As described herein, the processing platform includes a computer processing system and a novel enterprise service bus (ESB) to facilitate data communication and management. For example, upon receipt of an updated data object from an application instance, the data management and distribution functionality validates, stores, and broadcasts the state of the object back to the relevant client applications. Integration between applications thus becomes simpler by reducing the number of interactions (compared to point-to-point communications) using one central service. This can provide technical advantages of reducing the amount of data to be transferred between the applications, reducing the workload for a processing engine like a computer processor, and reducing the necessary bandwidth to be provided within the system for the communication between the applications, for instance. Data management efficiency is improved by having applications utilize an agreed upon data sharing model, which can provide a technical advantage of reducing a number of special purpose interfaces that would otherwise be needed for data conversion. In addition, over time, the data management and distribution functionality becomes more knowledgeable about the data objects being exchanged, thereby presenting another technical advantage of increasing the up-to-date reliability of data. Exemplary aspects will now be described with reference to the figures.

Figure 1:
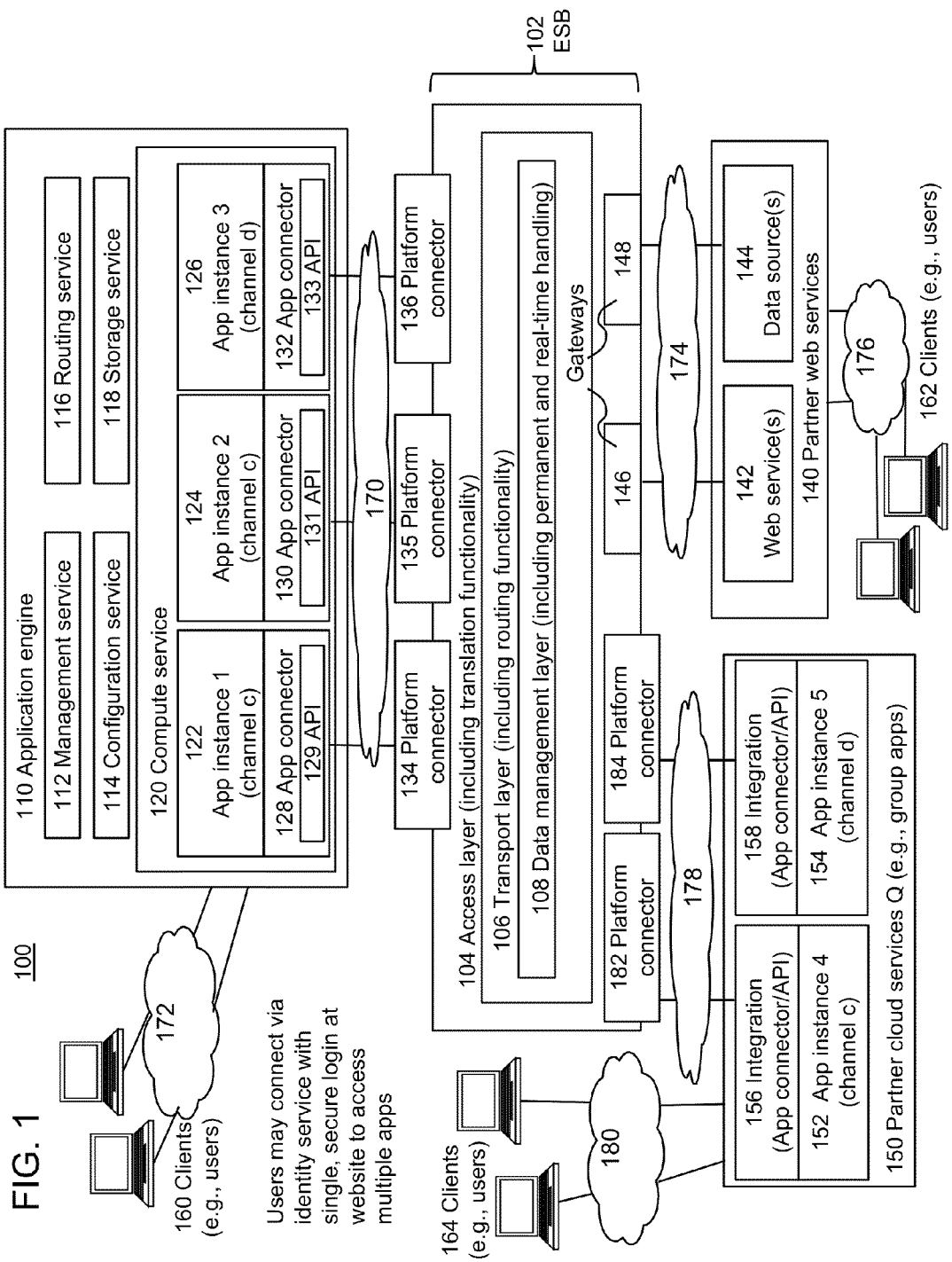
FIG. 1 illustrates an architecture of an exemplary network-based system for managing, updating and distributing data for data objects according to an aspect of the present disclosure.

FIG. 1 is a functional block diagram illustrating an architecture of an exemplary network-based system 100, implemented in software using multiple server computers, for managing, updating and distributing data for data objects according to an aspect of the present disclosure. As shown in FIG. 1, the system includes an application engine 110, partner web services 140, and partner cloud services 150 that communicate with a processing platform. In examples, web services 140 are services that allow entities such as companies and organizations to communicate data, e.g., without intimate knowledge of each other's information technology (IT) systems behind their respective firewalls. For example, web services do not directly provide individual users (that is, individuals) with graphical user interfaces (GUIs); rather, web services may provide programmatic interfaces (using, for example, but not limited to, JSON, XML or SOAP and the like) in order to share logic, data and processes across a network. In examples, cloud services 150 are services, including applications and/or data, that are made available to users (that is, individuals) on demand via the Internet from a cloud computing provider's servers, as opposed to being provided from a company's own on-premises servers. Cloud services may provide, for example, ease of access to applications, resources and services (using, for example, but not limited to, HTML5, JavaScript, Flash and the like) under the management of a cloud services provider. Those of ordinary skill in the art will appreciate that a service provider may combine the use of cloud services and web services.

The processing platform comprises, for example, a computer processing system (e.g., one or more computer processors, e.g., at one or more server computers, such as in a distributed computing environment) and an enterprise service bus (ESB) 102 implemented with the processing system. The processing platform may also comprise a traffic management system which may comprise one or more load balancers, webservers in reverse proxy mode, and the like. The application engine 110 and services 140, 150 communicate with the ESB 102 via networks 170, 174 and 178. The ESB 102 may be considered, for example, a software architecture comprising several layers of functionality including, for example, an access layer 104, a transport layer 106 and a data management layer 108 that facilitate communication of updated data for data objects between application instances 122, 124, 126, 152, 154 (e.g., instances of business applications such as personnel management applications and customer relationship management applications) and web services 142, which may both generate and receive updates for data objects. Thus, the processing platform may be viewed, for example, as an architecture of both hardware and software for providing integration and communication of updated data for data objects in a dynamic and evolving computer landscape of services and applications.

Clients, e.g., user computers 160, 162 and 164 (or users, for brevity) may communicate via networks 172, 176 and 180 with the application engine 110, partner web services 140 and partner cloud services 150 to run various instances of applications and web services. The various networks may include, in whole or in part, the Internet as well as private networks. A data object processed according to the methods and systems herein may be single object or a collection of multiple other objects, which may be considered sub-objects. As will be discussed more herein, according to the methods and systems herein, a data object may be updated and communicated via push communications in its entirety, or merely one or more portions of a data object may be updated and communicated. Alternatively, updates to a data object may occur through push notification messages that an object in the ESB 102 database has been updated and through subsequent retrieval of the object by an application instance pursuant to a request from the application instance.

Users may connect to the application engine 110 and/or partner cloud services 150 via a secure identity service using a single, secure login at a host website to access multiple applications via a single login procedure. Generally speaking, the application engine 110 may be under the control of a first entity or (e.g., a company like Maestrano, or an organization). Thus, the computing resources including server computers, etc., may be considered to be under the control of the first entity that controls the application engine 110, even if the entity that controls the application 110 leases or rents computing resources from a third party provider. The ESB 102 (and its associated computing resources, such as computer servers, etc.) may be under the control of the same first entity, but this is not necessarily required. However, by having the application engine 110 and the ESB 102 under control of the same entity, a technical advantage may be achieved in minimizing data communication problems and in permitting easier troubleshooting of data communication or other computing difficulties should problems arise. A given partner cloud service 150 (and its associated computing resources, such as computer servers, etc.) may be under the control a second entity (e.g., a different company, organization) that is different from the first entity that controls the application engine 110 and ESB 102 and that is different from the other entities (companies, organizations) that may control other ones of the partner cloud services 150 and their associated computing resources, such as computer servers, etc.). A given partner web service 140 may be under the control an entity that is different from the entity that controls the application engine 110 and ESB 102, that is different from the entities that control the partner cloud services 150, and that is different from the entities that may control other ones of the partner web services 140. The notion of control in this regard may refer to control of access and management of the respective platform.

Figure 2:
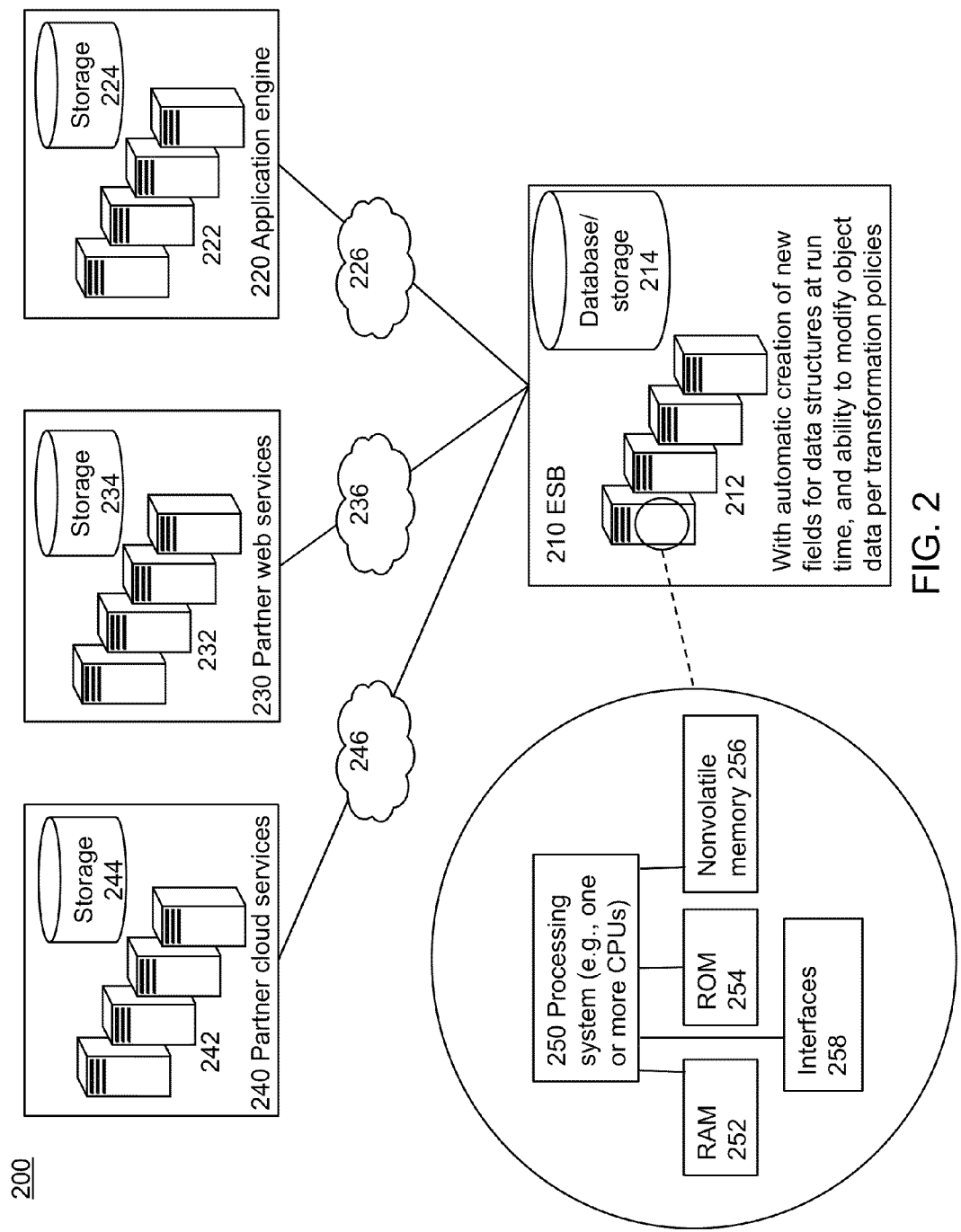
FIG. 2 illustrates an exemplary server implementation for the system illustrated in FIG. 1.

The framework in FIG. 1 may be implemented in software using multiple server computers that communicate via networks, such as shown in FIG. 2. In the example of FIG. 2, ESB 210 may be implemented using one or more server computers 212 along with dedicated memory storage 214. In addition, application engine 220 may be implemented using one or more server computers 222 along with dedicated memory storage 224. Similarly, partner web services 230 may be implemented using one or more server computers 232 along with dedicated memory storage 234. Likewise, partner cloud services 240 may be implemented using one or more server computers 242 along with dedicated memory storage 244. Communication between the ESB 210 and other components may occur via networks 226, 236 and 246. In addition, as shown in FIG. 2, the server computers may each include a processing system, which may be comprised of one or more CPUs, various non-transitory memory such as random access memory (RAM) 252, read only memory (ROM) 254, and nonvolatile memory 256 (e.g., hard disk, flash memory, optical disk, etc.), and various interfaces 258 such as communication interfaces, display interfaces, user interfaces (e.g., mouse, keyboard), etc. As will be discussed further below, the ESB, among other things, may support the automatic creation of new fields for data structures for data objects where previously unconfigured data is detected.

The methods and systems described herein, such as illustrated in FIGS. 1 and 2, may be implemented using any suitable processing system with any suitable combination of hardware, software and/or firmware. For example, software program instructions may include source code, object code, machine code, or any other stored data that is operable to cause a processing system to perform the methods and operations described herein. Any suitable computer languages may be used to implement the functionality described herein, such as Java, PHP, Ruby, C, C++, etc., as will be appreciated by those skilled in the art. Other implementations may also be used, and firmware or even appropriately designed hardware may be used to carry out aspects of the methods and systems described herein.

Returning to FIG. 1, the application engine 110 may include a management service 112, a configuration service 114, a routing service 116, a storage service 118, and a compute service 120. The management service 112 may be configured to control and manage the compute, storage, configuration and routing services. The management service 112 manages the lifecycle of applications by ensuring that resources are optimally allocated for each service. The management service 112 may also serve as a point of contact between an external client and the application engine 110.

The configuration service 114 may be configured to instruct, in a predetermined way, the compute service how to install, configure and maintain applications. The configuration service 114 may also deliver to the application container located inside the compute service 120 various libraries required to perform initial installation and configuration operations as well as any operation expected from the application throughout its lifecycle as described by the application code.

The routing service 116 may be configured to link applications to the Internet and make them available to customers via a static URL. According to an example, the routing service 116 may perform two types of routing: low level routing that routes traffic from a URL to a server (IP linking), and high level routing that directs the server(s) to which container communication traffic should be redirected (e.g., proxy linking).

The storage service 118 may manage the permanent storage of applications. In this regard, permanent storage can provide for the ability of offline applications to be available for use on demand from a user via the compute service 120. Moreover, the storage service 118 may be configured to be resilient against hardware failure by enabling several levels of replication, for example.

The compute service 120 may be configured to provide the required computational and memory resources to run applications of all sizes. In practice the compute service is designed to prepare, on the fly, ephemeral containers of defined sizes (also called power units) from raw resources. Such containers can be used to run applications. The compute service 120 may call the storage service 118 whenever it needs to load an offline application or save the state of a running/stopping application. As shown in FIG. 1, the compute service 120 may run multiple application instances, e.g., such as application instances 122, 124 and 126. These application instances may be associated with various channels (e.g., channels c and d), wherein a channel as used herein refers to a group of data which can be accessed and/or updated by certain clients. In the example of FIG. 1, each application instance 122, 124 and 126 may be associated with an application connector (app connector) 128, 130 and 132, respectively, each of which may be built from or include an application programming interface (API) 129, 131, and 133, respectively.

Each app connector 128, 130 and 132 may be a client-specific (application-specific) module and may be configured to permit an application to publish data to a channel upon processing internal events, e.g., such as detecting of whether an application instance 122, 124 or 126 has created a new object or updated an existing object, and deleted an existing object. Each app connector 128, 130 and 132 may also be configured to receive and process data received from a channel, e.g., updated data objects that have been updated by other application instances. Each app connector 128, 130 and 132 may be built from or include an API 129, 131, and 133, respectively. In this regard, the APIs 129, 131, 133 may be considered client-specific (application-specific), as well as language-specific, libraries that provide out-of-the-box functions and suitable framework to facilitate communication with the ESB 102 and that can simplify the development of the app connectors 128, 130 and 132 (e.g., developers can use the API framework to efficiently create app connectors 128, 130, 132 with minimal programming/coding effort being required). The developer may choose to develop an app connector 128, 130, 132 on top of an API 129, 131, 133, in which case the app connector would wrap the API in its core and extend it. In other examples, an API function may be sufficiently sophisticated so as to essentially serve as a plug-in to provide the necessary functionality for an app connector 128, 130, 132, in which case as a practical matter the app connector and the API may be considered to be the same thing. In other cases, an app connector 128, 130, 132 need not be developed through use of an API but can be coded by a developer from scratch using any suitable programming language to produce the behavior and functionality expected by the remote ESB 102. The app connectors however constructed may be configured to manage client specific metadata as well as object substantive data to facilitate the object updating and communication as described herein. Such metadata may include client identification information, client program preferences, and client contextual information, for example.

An app connector 128, 130, 132 can be configured to automatically provide a variety of useful functions. In some examples, an app connector 128, 130, 132 can be configured, e.g., based on an API framework, to generate primary identification keys based on object attributes that may be used to link together different objects (e.g., in an accounting environment two accounts with the same purpose, e.g., operational expenses, could be virtually linked together using smart primary identification keys, e.g., where unique identifiers for the respective objects are different. In some examples, app connectors 128, 130, 132, e.g., based on an API framework, may be configured for automatically checking whether data objects from an application instance contain data of a type previously unconfigured in associated data structures and if so automatically creating corresponding data fields for the associated data structure for the object. App connectors 128, 130, 132 may be configured for communicating data objects to the ESB 102, validating the object data structure and managing links to other ESB-side objects (e.g. linking projects with assigned members), and retrieving ESB-side objects based on their identifiers, and retrieving a collection of ESB objects based on attributes values or range of values. Functionality that performs automatically, as referred to herein, means that the functionality does not require human intervention to trigger, initiate or carry out that particular functionality. That does not mean, of course, that the systems and methods described herein operate without human interaction, since human interaction with applications, web services, and the like is expected and desired. It should be understood that, according to the present disclosure, the functions carried out by app connectors, APIs, platform connectors, gateways, integration modules, as well as ESBs may all be carried out automatically in this regard.

As shown in FIG. 1, the application instances 122, 124 and 126 of the application engine 110 may communicate with the ESB 102 via a network 170. According to the present disclosure, the ESB 102 is a primary component (along with various application connectors, platform connectors, and APIs) of data management and distribution functionality that may be implemented using software and one or more server computers to facilitate communication between hosted applications, cloud-based applications and web services. The ESB 102 may comprise several layers of functionality including, for example, an access layer 104, a transport layer 106 and a data management layer 108.

According to an exemplary aspect, the access layer 104 may be configured to validate and format data objects (including any new data fields created), may include translation functionality, and may manage the communication between a network of clients that run various applications and the data management and distribution functionality. The access layer 104 may be configured to receive updated data from clients running various application instances and provide updated data, with the support of the transport layer 106, to the application instances of one or more clients in a share group, e.g., clients that are approved participants of a given group to receive updates, such as in a company or other organization. Suitable information (e.g., lists) identifying groups of clients that have agreed to share updated object data for desired applications may be maintained in a database accessible by the ESB 102. In addition, suitable information (e.g., lists) of client preferences regarding the types of data updates the clients would like to receive at their applications or any other types of preferences may also be maintained in a database accessible by the ESB 102. Such lists may be populated and adjusted as appropriate based on configuration settings set up by the users and/or administrator(s) of the client applications. Thus, requests may be received from clients to access and modify such lists, and these requests may be processed and implemented by the processing system of the ESB 102. In one exemplary aspect, the format of data for data objects may be translated by the access layer 104 according to any suitable translation algorithms in both directions, i.e., both from client application instances to the transport layer 106 and vice versa. Such translation may be accomplished, for example, by any suitable configuration of tables that maps fields of one data format (used by client application) to another data format (used by ESB 102). In another example, all or some of the translation functionality may be carried out by app connectors 128, 130, 132, e.g., based on APIs. The access layer 104 both provides data to and receives data from the transport layer 106. In the example of FIG. 1, the ESB 102 also includes platform connectors 134, 135 and 136 at the access layer 104. The platform connectors 134, 135 and 136 are virtual interfaces that are opened when an application instance of a client and the ESB 102 communicate. A platform connector may be created at connection time and contains the communication specifics for a given application instance, e.g., format of data, endpoint URLs, etc.

In an exemplary aspect, the transport layer 106 may be configured to transport and route data to the desired application instances, via the access layer 104, as well as communicate with data management layer 108. The transport layer 106 may support point-to-point, point-to-multipoint, or broadcast message delivery. Thus, the ESB transport layer 106 may send updated data for objects, or messages notifying of updated data, to an individual client application, a group of client applications, or to all members of a share group via a broadcast communication. The ESB transport layer 106 may send updated object data to a group of client application instances synchronously or asynchronously. The transport layer 106 may utilize any suitable routing algorithms, such as those known to those of ordinary skill in the art. The transport layer may be configured to detect that an object is to be published to a given data channel, retrieve the list of applications having subscribed to that channel, and then pass that information to the access layer 104.

In an exemplary aspect, the data management layer 108 may be configured to manage the retrieval, creation, expiration, update and archiving of data objects, or portions of data objects, which may be treated as resources. The data management layer 108 can be configured to update the permanent storage of data for data objects (resources) and to provide for real-time updates (via the transport layer 106) to live application instances in a given share group so that approved participants may receive real-time updates of data generated by other participants running other application instances. A dynamic list of which application instances are currently live, along with the associated, user, share group, and/or channel of data associated with that application instance can be maintained on an ongoing basis at the ESB 102. For example, the transport layer 106 may detect a partial modification of a data object (resource), and this detection can be communicated to the data management layer 108. The data management layer 108 may then determine to broadcast via the transport layer 106 either a full data object (resource) or just the updated portion(s) of the data object to the relevant channel(s), to permanent storage, and to live application instances associated with a share group that are authorized to receive data updates. As noted previously, a channel as used herein refers to a group of data which can be accessed and/or updated by certain clients. Thus, in addition providing an update to permanent storage, all application instances subscribing to the channel may receive a fully updated data object (full resource) with modified information, or a partial update of the changed portions of the data object. In this regard, the transport layer 106, at the instruction of the data management layer 108, may push newly updated object data to live application instances of authorized users. In this way, data augmentation may be facilitated over time since the applications work together to provide updates, thereby making a resource description more complete.

The decision by the data management layer 108 regarding whether to broadcast a full data object or merely the updated portion(s) of the data object may be based upon checking a decision tree that reflects preferences, e.g., preferences initially set up by the user or manager of an application or set of applications in various configuration settings, that govern how objects including associated objects are to be shared within a share group, e.g., according to a subscription to a channel of data. The decision tree may specify whether portions of objects or entire objects should be communicated upon update of an object or upon triggering of specified update conditions. For example, the data management layer 108 may determine, e.g., with reference to a decision tree, that entire objects should be communicated to any live application instances within a share group whenever the object or an associated object is updated by another application instance. As another example, if some objects (or sub-objects) are effectively encapsulated or nested within a higher-level object, the data management layer 108 may determine, e.g., with reference to a decision tree, to broadcast one or more nested/encapsulated objects when one of the associated objects has been updated, but to not broadcast the higher-level object in such an instance. This exemplary scenario may also be invoked where a data object for a project includes fields within the associated data structure that are readily identifiable as being associated with tasks of the project, in which case merely the updated data for specified fields of the object may be communicated to other live application instances. In addition, the routing of the updated data may be accomplished by identifying appropriate destinations associated with the updated data object. For example, appropriate routing may be accomplished by checking any suitable identifying information associated with the data object, looking up the corresponding channel(s) and/or share group(s) associated with the identifying information (e.g., via suitable tables), identifying any live application instances that are associated with the identified share group(s) for data updates, e.g., excluding any offline applications or online applications that are precluded based on internal security policies (e.g., static or dynamic policies), and communicating the updated data to the identified channel(s) and the live application instance(s) of users approved (authorized) for updated data.

In addition, the ESB 102 may be configured to reapply and retransmit updates under certain circumstances, e.g., where data corruption has been detected by the ESB data management layer 108. For example, it is conceivable that partner cloud services 150 could generate corrupted data, e.g., which could be detected by any suitable algorithms for monitoring data integrity and detecting data anomalies at the ESB data manage layer 108. In such an instance the impacted data objects can be reverted back to their prior states in the database of the ESB 102 (i.e., their states prior to corruption), and all of the subsequent updates that occurred for the impacted objects could be retransmitted, ignoring the corrupted data from the partner cloud services 150. The retransmission can be accompanied by one or more notification messages sent to the appropriate administrator(s) to alert them to the problem so that remedial action may be taken to correct the problem causing the corruption. The ability of determining whether any data corruption impacting objects has occurred, and if so, reverting the objects back to their states prior to the corruption, and reapplying and retransmitting any previously transmitted object updates to remedy the corruption of the objects can provide a technical advantage of protecting and maintaining the integrity of data objects in centralized manner, thereby preventing haphazard and incomplete remediation, which might leave some corrupted data objects uncorrected.

In addition, the ESB 102 can be configured to support a variety of communication protocols and payload formats known to those of ordinary skill in the art. In this regard, the ESB 102 may manage and extend the list of supported communication protocols via code extensions. The ESB 102 may also manage and extend the list of supported payload formats via code extensions.

With reference again to the example of FIG. 1, the system 100 may also include partner web services 140, which may communicate with the ESB 102 via network 174. The partner web services 140 may include one or more web services 142, such as social media or professional networking services (e.g., such as Twitter, LinkedIn, etc.), web services for commercial services (e.g., such as commercial delivery couriers like FedEx, UPS, DHL, subscription-based information services like those available from Bloomberg, LexisNexis, Thomson Reuters, etc.), and one or more data sources 144, such as any data sources upon which the web services 142 might utilize. The partner web services 140 can either be services which share information with the ESB 102 via authorizations provided by users 162, or the partner web services 140 may be private services provided to the entity (company) that controls the ESB 102 and/or application engine 110 according to some agreement. In order to communicate with the ESB 102, the partner web services 140 may connect to or be accessed via connection gateways 146 and 148 at the access layer 104 of the ESB 102. The gateways 146 and 148 may include suitable service-specific service connectors (e.g., which may utilize APIs) and platform connectors similar to the app connectors 128, 130 and 132 (which may utilize APIs 129, 131, and 133) and platform connectors 134, 135 and 136 associated with the application engine 110 as described above. The service connectors, APIs, and platform connectors that comprise the gateways 146 and 148 may be service-specific, and may provide functionality similar to that of the app connectors 128, 130 and 132, APIs 129, 131, and 133, and platform connectors 134, 135 and 136 described above in order to facilitate the validation, formatting and communication of updated objects to and from the ESB 102. Users 162 may access the partner web services 140 via network 176, e.g., the Internet. As mentioned previously, a given partner web service 140 may be under the control an entity that is different from the entity that controls the application engine 110 and ESB 102, that is different from the entities that control the partner cloud services 150, and that is different from the entities that may control other ones of the partner web services 140.

As further shown in the example of FIG. 1, the system 100 may also include partner cloud services 150, which may communicate with the ESB 102 via network 178. The partner cloud services 150 may include one or more application instances 152 and 154 similar to application instances 122, 124 and 136 described above in connection with application engine 110. The application instances 152 and 154 likewise may be associated with particular channels, e.g., channels c and d as shown, such as described above in connection with application engine 110. The application instances 152 and 154 may communicate with the ESB 102 via integration modules 156 and 158, respectively, and via platform connectors 182 and 184, respectively. The app connectors (e.g., using APIs) that comprise the integration modules 156 and 158 may be client-specific (application specific), and may provide functionality similar to that of the app connectors 128, 130 and 132 and APIs 129, 131, and 133 described above in order to facilitate the validation, formatting and communication of updated objects to and from the ESB 102. The platform connectors 182 and 184 may likewise provide functionality similar to that of platform connectors 134, 135 and 136 described above in connection with application engine 110. In an example in the cloud context, an application instance may be configured as a group of multiple users, and an organization may be created via a cloud service dashboard thus permitting sharing of data among the group of users across multiple applications as well as with the ESB 102 and other application instances connected thereto.

Users 164 may access the partner cloud services 150 via network 180, e.g., the Internet. As mentioned previously, a given partner cloud service 150 may be under the control of an entity that is different from the entity that controls the application engine 110 and ESB 102 and that is different from the entities that may control other ones of the partner cloud services 150. In an example, where a first company like Maestrano may control the application engine 110 and may agree to provide access to its users (customers) to the application(s) of a second company via the application engine 110, the second company itself may also still provide access to the same application(s) or other applications via its own cloud service 150 while still permitting the application(s) accessed through the partner cloud services 150 to interact with the ESB 102. For instance, the second company may provide its source code for the applications at issue to the first company, so that the first company may provide those applications directly via the first company's application engine 110 to its customers.

Figure 3:
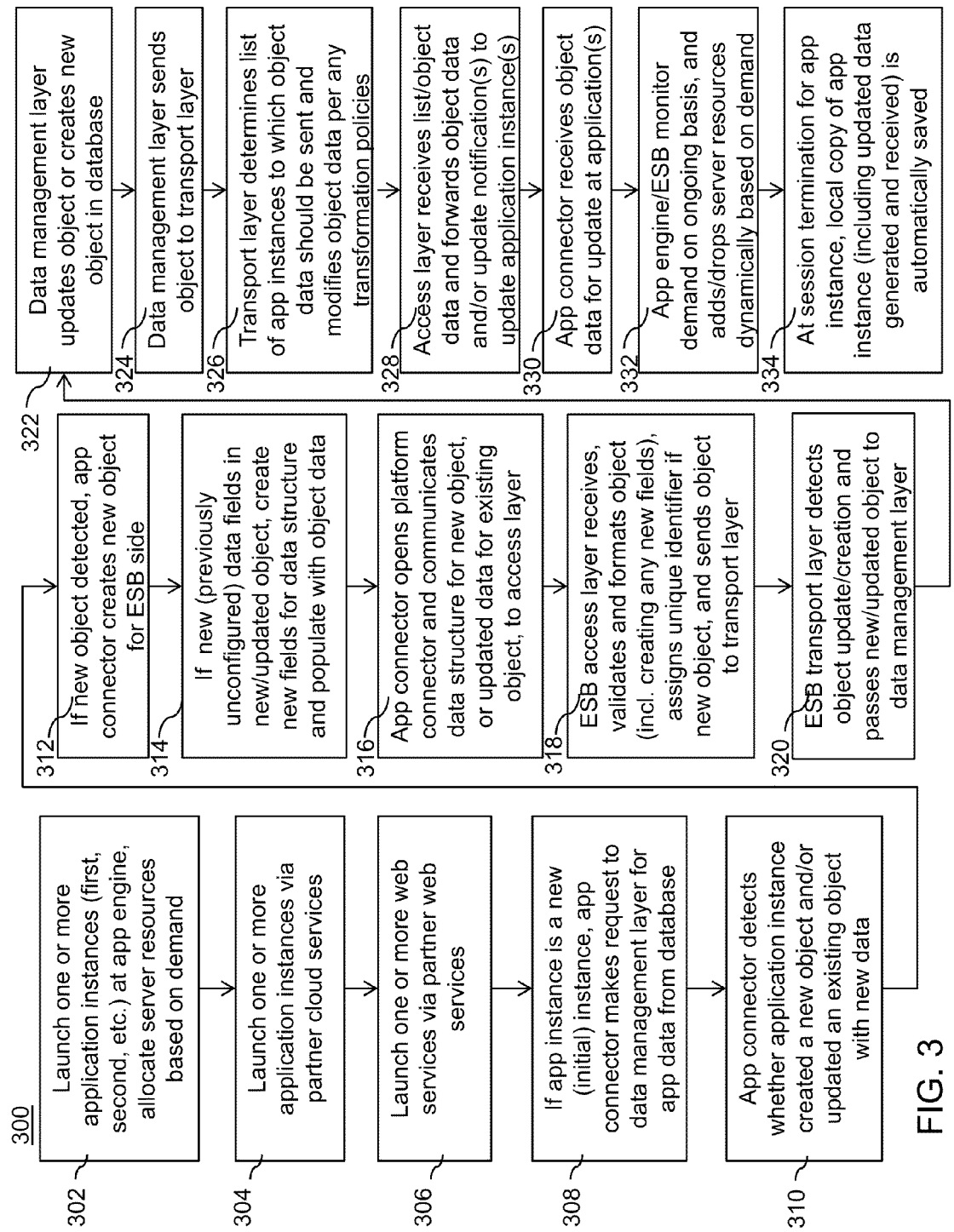
FIG. 3 illustrates a flow diagram for an exemplary method of managing, updating and distributing data for data objects according to an aspect of the present disclosure.

An exemplary method of updating and communicating data objects using the exemplary system illustrated in FIGS. 1 and 2 will now be described with reference to FIG. 3. FIG. 3 shows a flow diagram of an exemplary method 300. Although the exemplary method 300 will be described with regard to a flow diagram and various steps, it should be understood that the steps need not be executed in the order described. Indeed, most if not all of the steps could be occurring in different orders or simultaneously considering that numerous application instances and web services may be running and communicating their associated updates for various data objects concurrently.

As shown in the example of FIG. 3, and with additional reference to FIG. 1, at step 302 one or more application instances, e.g., 122, 124, 126, 152, 154 (first, second, third, etc.) are launched at the application engine 110, e.g., at different times. The application engine 110 monitors computing resources required and allocates server resources accordingly based on demand. For instance, the entity in control of the application engine may contract for server resources on an as needed basis, such that when the demand for applications is high, more server computers are automatically invoked to provide for the required demand.

At step 304 one or more application instances, e.g., 152, 154, may be launched via partner cloud services 150, e.g., at different times. These application instances may be the same type of applications as launched at the application engine 110, or they may be different applications. The application instances 152 and 154 may be subscribed to the same channels, e.g., channels c and d, that various ones of the applications 122, 124 and 126 may be subscribed to, so that application instances invoked via the application engine 110 and via partner cloud services may share updates for the same channel (data). At step 306, one or more web services 142 may be launched via partner web services 140. These services 142 may likewise be subscribed to at least some of the same data channels to which application instances running on application engine 110 and partner cloud services 150 are subscribed to, such that the web services may likewise share updated data with those application instances as well as permanent storage, e.g., storage 214.

At step 308, an app connector, e.g., 128, 130, 132, may automatically determine that the app instance, e.g., 122, 124, 126, is a new (initial) instance of an application, in which case the app connector 128, 130, 132 may make a request to the ESB data management layer 108 to obtain application data from a database at permanent storage, e.g., storage 214. This is done because upon the initial, i.e., the very first, startup of an application instance, the application instance would not yet have been populated with data. Thereafter, once an application has been populated with data, it not only provides updates to permanent storage and other application instances as described herein, but also saves a local copy of the application instance including the associated data in the current state.

At step 310, the app connector, e.g., 128, 130, 132, may automatically detect whether an application instance, e.g., 122, 124, 126, has created a new object and/or has updated an existing object with new data. The object could be, for example, an employee record for an employee newly hired by a company or an employee whose employment status (e.g., job position) has changed. At step 312, if it is determined that a new object has been created by an application instance at the application (client) side, the app connector, e.g., 128, 130, 132 (e.g., using functionality of an API 129, 131, 133), creates a corresponding new object for the ESB side. The app connector, e.g., 128, 130, 132 can extract relevant fields from the new/updated object (e.g., name, surname and email address of a new employee) and can create a new data object using these fields. More generally, to facilitate the object creation process for the ESB side, the app connector, e.g., 128, 130, 132 may access existing transformation tables which may correlate the field names used for objects at the client (application) side and field names used for objects at the ESB side. The type of object (e.g., "employee"), can added to the data object by the app connector, e.g., 128, 130, 132 (e.g., using API functionality). An application ID for the associated application instance may also be added to the data object by the app connector, e.g., 128, 130, 132 so that the source of the data object can be identified at a global level.

At step 314, the app connector, e.g., 128, 130, 132 (e.g., using API functionality) may automatically detect whether data fields of a type previously unconfigured are present in the object (e.g., new or updated object) passed from the application (client) side via an app connector, e.g., 128, 130, 132. This can be done, for instance, by checking whether the data object from the client (application) side contains field names that are not present in the transformation tables. In such a case, the app connector, e.g., 128, 130, 132 may automatically create and add new fields to the data structure for the corresponding ESB-side data object and may populate that data structure with object data. In this way, the format of the data structure itself for the ESB-side object may be automatically and dynamically changed to include new fields, as opposed to simply updating contents of existing fields with new data.

At step 316, when an internal event is triggered at an application instance 122, e.g., the creation of a new data object or the update of an existing data object, the app connector, e.g., 128, 130, 132 opens a connection, e.g., platform connector 134, 135, 136, to the ESB 102, and communicates data for the object to the ESB access layer 104. For example, if the object was a newly created object, the app connector, e.g., 128, 130, 132 may communicate the entire new data structure for the new object created by the app connector, e.g., 128, 130, 132 to the ESB access layer 104. If, however, the event generated at the application instance is an update of an existing object, the app connector, e.g., 128, 130, 132 may simply send updated data for the relevant fields for the object (e.g., including the particular field identifications) to the ESB access layer 104. This may provide a technical advantage of reducing the amount of data to be transferred and reducing the needed bandwidth, for example, since the entire updated object need not be sent to the participating applications in connection with the update. The app connector, e.g., 128, 130, 132 (e.g., using API functionality) can pass the new/updated object created at the application (client) side to the platform connector, e.g., 134, 135, 136, e.g., based on triggering of a code hook, e.g., a section of code configured to take a specific action based on a specific event. For example, a save function that was originally designed to save data to a database in an underlying application can be appended with a code hook to also save data to the ESB 102 for integration as described herein.

At step 318, the ESB access layer 104 receives the data object from the app connector, e.g., 128, 130, 132 via a platform connector, e.g., 134, 135, 136, and may automatically validate and format the object (including any new fields), assign a unique identifier if the object is a new object, and communicate the object to transport layer 106. The ESB access layer 104 may validate the object, for example, by verifying that the type of data object is known (e.g., that the object type "employee" is a known object type). Upon successful validation, the access layer 104 may determine that the data object does not already have an associated universal unique identifier (UUID) and may determine that the object is a (universally) new object. The ESB access layer 104 may then format the object by generating and assigning a unique identifier, e.g., a UUID, to the data object. The type of operation (e.g., creation, update, etc.) may also be attached to the object by populating the operation type field of the associated data structure. Once that is done, the ESB access layer 104 may send to the application instance, e.g., 122, 124, 126, a notification message with a "success" status code and the associated unique identifier, e.g., UUID. Upon receipt of this message, the application instance may attach the unique identifier to its local client-side (application-side) object by updating the corresponding field of its data structure. At the same time the data receiver passes the data object to the inbound data processor module of the data management system.

At step 320, the ESB transport layer 106 may detect the object update/creation, process the object, and pass the object to the ESB data management layer 108. In this regard, the ESB transport layer 106 may reads the application ID associated with the object. Based on this ID, the transport layer 106 may retrieve an identifier of the group of applications having agreed to exchange data together, e.g., the applications associated with the application instances 122, 124, 12, and may also retrieve the identity of the channel(s) of data to which the object is associated. The group identifier can be attached to the data object via an appropriate field of the associated data structure. Then the transport layer 106 may read the type of operation associated with the object (e.g., creation or update). The transport layer 106 may also determine, with reference to a database at the ESB 102, whether or not there are any inbound data transformation policies (transformation rules) applicable to data object, e.g., whether the received object data contains information matching the application ID, the group ID, the type of object and/or the type of operation as may be contained in a data table or list of transformation policies (rules). If no applicable policies are found, the transformation layer 106 may apply the default "null transformation" policy which leaves the data object unchanged, other than the update that has already occurred to any data fields. If one or more applicable transformation policies are found, the transport layer 106 may apply an appropriate transformation to modify the appropriate object data, e.g., which may include changing data, augmenting data by adding additional data to the data object, or reducing data by removing certain data from the data object. As an example, a transformation policy may require combining classifications, sub-classifications, sub-sub-classifications for appropriate data of a data object for a financial account. In an example, it may be preferable to not require transformation policies to "inbound" object data that would reduce data before the object data is communicated to the data management layer 108 (i.e., to not filter inbound object data). It may instead be preferable in some examples to permit inbound object data to be communicated to the data management layer 108 without any reduction so that the data management layer 108 may be continually updated with the most complete data available instead of filtering inbound object data at the transport layer 106. The ESB transport layer 106 may then forward the data object to the ESB data management layer 108.

The transformation policies, regardless of whether applied to inbound object data or outbound object data, may be stored in a database accessible by the ESB 102, and these policies may be static or dynamic, e.g., according to configuration settings of applications set by client users and/or administrators and communicated to the ESB 102, and these policies may be regularly updated in the database of the ESB 102 over time. It should be understood that a modification to object data carried out by the ESB 102 according to such a transformation policy, whether applied inbound data or outbound data, is different than and goes beyond any changes to the object data made by the application instances themselves.

At step 322, the ESB data management layer 108 receives the object and updates the database, including possibly creating (writing) a new object to the database, as appropriate. For example, the ESB data management layer 108 reads the type of operation (e.g., creation, update) and stores the object into its internal database, e.g., at permanent storage 214, as a new object. If the operation is an update, the ESB data management layer 108 instead would update the object based on the unique identifier, e.g., UUID, and designate the previous version of the object as "expired."

At step 324, the ESB data management layer 108 forwards the object to the ESB transport layer 106, e.g., for communication to other live application instances in the share group subscribed to the associated channel. At this point, in an example, the ESB data management layer 108 has finished updating its internal database (e.g., storage 214) and can forward the data object to the ESB transport layer 106. In an example, even in the case of a partial update of an object (e.g., an update only the name of an object). The entire, up-to-date object can be passed to the ESB transport layer 106, e.g., for communication to other live application instances in a share group. Alternatively, merely the updated portion of the object may get passed to the ESB transport layer 106. For example, if an object (or sub-object) is nested within another (parent) object, it can be useful to only broadcast the nested object if the entirety or a majority of the parent object was not updated.

At step 326, the ESB transport layer 106 receives the new/updated object and may determine which ones of the live application instances should receive new/updated object data for the object and may create a list of the live application instances, and this can include the application instance that generated the object update under attention. More generally, the transport layer can determine a list of applications to which updated object data should be sent, whether instances are currently live or not. The transport layer 106 may also determine, with reference to a database at the ESB 102, whether or not there are any outbound data transformation policies (transformation rules) applicable to data object, e.g., whether the received object data contains information matching the application ID, the group ID, the type of object and/or the type of operation as may be contained in a data table or list of transformation policies (rules). If no transformation policies are found, the ESB transformation layer 106 may apply the default "null transformation" policy which leaves the data object unchanged, other than, of course, the update that has already been applied to any data fields by the application instance. If transformation policies are found, the transport layer 106 may apply an appropriate transformation to modify the appropriate object data, e.g., which may include changing data, augmenting data by adding additional data to the data object, or reducing data by removing certain data from the data object, e.g., hiding credit card details for applications that are not PCI compliant. The ESB transformation layer 106 may then determine, e.g., retrieve, the list of applications belonging to the group identified by the group ID attached to the object (and may check the database for live instances of those applications), and may also retrieve the identity of the channel(s) of data to which the object is associated. The ESB transformation layer 106 may also retrieve the list of data preferences for each application, e.g., those for the currently live application instances. For example, application instances 122 and 124, both subscribed to channel c, may have both requested to receive employee updates. Therefore the ESB transformation layer 106 may pass the data object along with the application IDs of those application instances to the ESB access layer 104. As noted above, the object data being communicated may be an entire updated object, partial data of an object, or a sub-object that may be considered nested within another object. As another example, the object data to be communicated might merely contain a unique identifier of the object (e.g., UUID), the object type, and/or a set of characteristic attributes notifying the destination application that object data for an object or a collection of objects have been updated and are accessible and available for retrieval when the application is ready to get synchronized. In this regard, the application instance(s) may be notified of an update via a message, and the application instance may then initiate a request to receive the updated data according to a desired schedule, which may be set, e.g., via the application configuration settings.

The ESB 102 may manage the data traffic associated with updates to object data as appropriate. For instance, many application instances may be making changes to many objects over short time frames, e.g., thousands of updates over tens or hundreds of milliseconds, and the ESB can manage the communication of the associated updates by suitable bundling of data for communication. This can provide technical advantages, in connection with providing the desired object updates, of reducing the amount of data being exchanged, reducing the processing load by reducing the number of processing steps required, and reducing the memory required, which permit more data to be processed overall using the same computing resources, or which reduce the cost and amount of computing resources needed to accomplish the work required. Thus, for example, it may be advantageous to send an update for 20, 50, or 100 data objects, etc., as a group to one or more application instances, instead of sending a much higher number individual communications for updates to objects one-by-one. Such bundling preferences could be set, for example, in configuration settings of the applications, or could be set in configuration settings applicable for the ESB 102. Moreover, where an application may request an update to a library of objects (e.g., thousands of objects) at one time, e.g., at the start up of the application instance, the ESB 102 may communicate those updates in bundles for 20, 50, 100, etc. objects as a group, so as to maintain real-time updates to all live application instances. As described herein, updates for object data can be processed and shared via the ESB 102 among various live application instances and web services in real-time. As referred to herein, processing such updates in real-time may permit updated data to be communicated to live application instances within a fraction of a second, e.g., within about 0.1 to 0.5 seconds, within about 1.0 second, or within several seconds, e.g., within about 2, 3, 4, or 5 seconds, for example. Such updates would be considered real-time updates.

At step 328, the ESB access layer 104 receives the list of live application instances (or list of applications more generally, whether live or not) and the object data and forwards the object data, or forwards notifications that updated object is ready to be retrieved, to update the appropriate application instances, e.g., 122, 124, 126, 152, 154, which may have subscribed to an appropriate share group associated with a given channel (e.g., including the application instance that initiated the update). The object data may be communicated in this regard to each application instance according to particular preferences saved in a database at the ESB 102 regarding how each application should receive updates, e.g., entire objects, partial object data, notification messages to provide for subsequent retrieval by an application, etc. In this regard, the ESB access layer 104 may open a connection, e.g., platform connector 134, 135, 136, 182, 184 for communicating with the appropriate application instance(s). As noted above, the object data might be updated data for an entire object or data for a merely a portion of an object, or the object data might merely contain a message with the unique identifier of the object (e.g., UUID), the object type, and/or a set of characteristic attributes notifying the destination application that object data for an object or a collection of objects have been updated and are accessible and available for retrieval when the application is ready to get synchronized.

At step 330, the app connector(s), e.g., 128, 130, 132 (e.g., which may utilize an API, e.g., 129, 131, 133) for the application instance(s), e.g., 122, 124, 126, 152, 154 receive object data for update. For example, the app connector 128 for application instance 122, the app connector 130 for application instance 124, and the app connector of integration module 156 of application instance 152 may all receive updated data for the data object insofar as these application instances are all associated with the same channel (channel c in this example) and are authorized recipients within a share group. As noted above, this update may occur by virtue of either receiving the complete or partial object data for one or more objects directly or by receiving a message notification alerting than an updating has occurred and then performing a retrieval of the object data by the application instance(s). In this regard, these app connectors may detect the type of object, e.g., that the object is of type "employee." The app connectors may then attempt to fetch a local data object matching the unique identifier, e.g., UUID, of the data object. Each of the app connectors may determine that a local object is found. In that case, the app connectors each merge the attributes of the ESB-side data object received from the ESB access layer 104 into the local client-side (application-side) object and then save the local client-side (application-side) object. At this point, application instances 122, 124 and 152 are now up-to-date. It may be noted that the application instance that initiated the update may be considered an out-of-sync subscriber even though it was the initiator of the request. In a high concurrency environment multiple updates can happen at substantially the same time. To ensure consistency across all applications subscribing to a channel it can be beneficial to broadcast the last state of a given object—including to the application instance that initiated the update.

Step 332 reflects the fact, that while all of the foregoing steps may be occurring, in whatever order, the application engine 110 may monitor on an ongoing basis demand for computer resources, e.g., for running applications based on user demand, and the ESB 102 may monitor on an ongoing basis demand for computer resources, e.g., for data communication and storage, and each may automatically add and/or drop computer resources dynamically based on demand at any given time, e.g., each may add or drop server computers at a respective farm of server computers. This functionality may contribute to an efficient and low-cost solution for object management and distribution in an enterprise setting, particularly where a first company that provides the ESB 102 and/or the application engine 110 leases computing and/or storage resources on an hourly basis from a third party, for example, to provide services. It should be understood that even where a first company that provides the ESB 102 and/or the application engine 110 by leasing resources from the third party, the first company still controls the applications and data management services via the ESB 102 and/or the application engine 110. As shown at step 334, at the session termination of a given application instance, a local copy of the application instance (including the updated data generated by that application instance and updated data received from other application instances) is automatically saved.

It will be appreciated that second organization (e.g., a customer of the first company) may be the underlying source of one or more applications associated with application instances 122, 124, and 152 (e.g., may be the provider of the source code) or may be a licensee of a third organization that provides the source code those applications via the application engine 110 in partnership with the first company. The customer (second organization) may provide authorization that those particular underlying applications should exchange data for users of the share group. The customer may provide such authorization via user interface (e.g., a website). This authorization action from the customer may send a request to the ESB 102, which maintains the list of applications having agreed to communicate together. Upon receipt of any subsequent authorizations, the internal list may be updated to reflect an updated list of applications and an updated share group that should be sharing information.

As noted above, the application engine 100 may monitor computer demand for applications at the application engine 110 and computer demand for data management at the ESB 102 on an ongoing basis, and may automatically add and/or drop computer resources, e.g., server computers, dynamically based on demand at any given time. This can provide technical advantages of freeing up such computing resources for use in supporting other computing needs or for reducing the costs associated with supplying computing resources by dynamically and temporarily dropping those that are not needed at any given time. This mode of providing services may facilitate an advantageous business model wherein customers may purchase services (application instances for their employee users) on an hourly, daily or monthly basis based on the number of applications that the customer has requested to use (either calculated per the number of authorized users or without regard to the number of authorized users of the customer), which may provide for lower costs to the customers compared to scenarios in which customers might purchase dedicated applications to run on their own computing infrastructure or leased computing infrastructures. This is because the present framework provides for the ability to utilize only the server resources needed at any given time, thereby providing for lower cost services, the savings of which may be passed along to the customer. In an example, determining the cost of application services and data management services in this way may be done without regard to the amount of storage actually used by a customer and its users.

Figure 4:
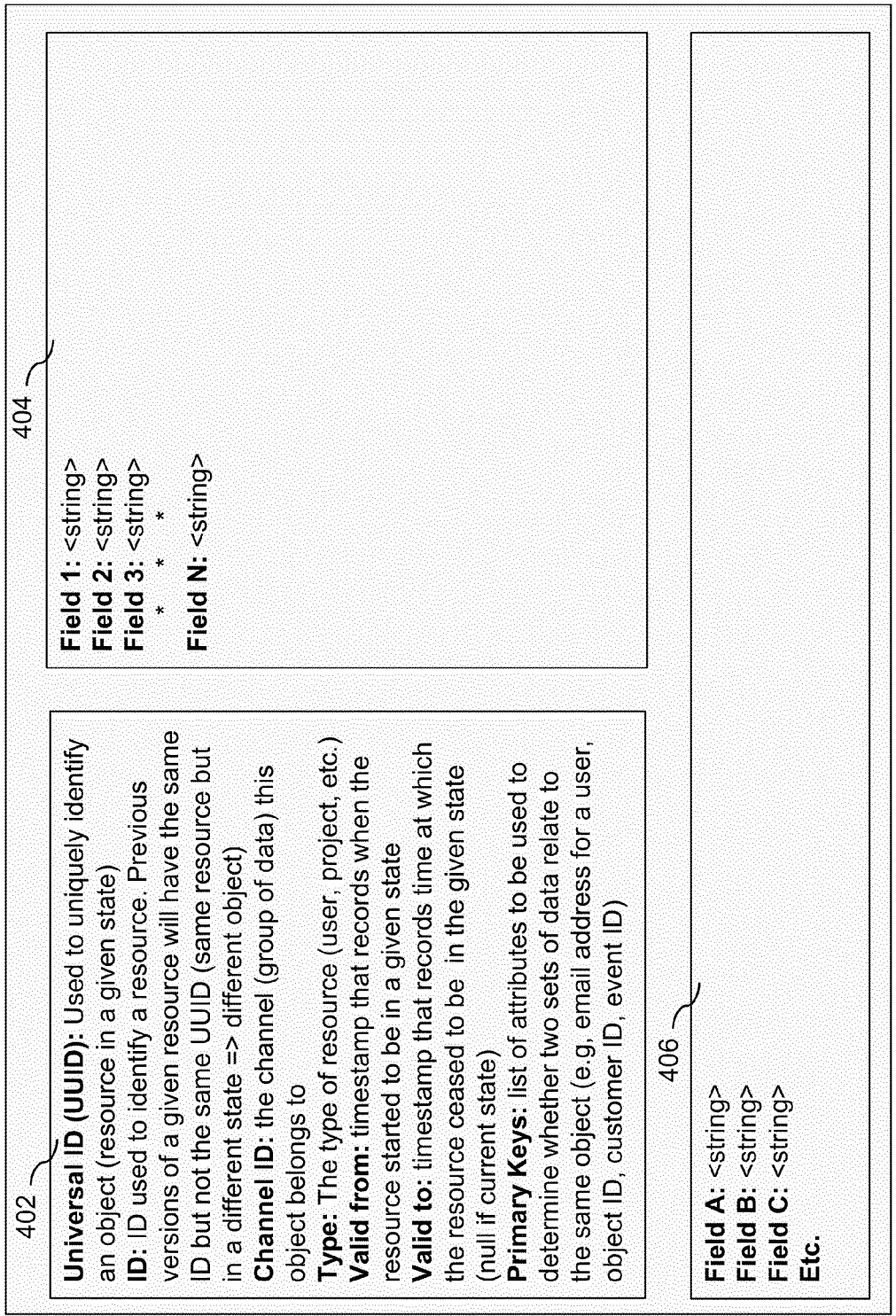
FIG. 4 illustrates an exemplary data structure for data objects according to the present disclosure.

FIG. 4 illustrates a block diagram of an exemplary data structure 400 that can be stored in memory for a data object that may be generated, updated and distributed/shared across multiple applications via an ESB according to exemplary approaches described herein. That is FIG. 4 reflects an exemplary data structure for an ESB-side data object as opposed to a client-side (application-side) data object. In the example of FIG. 4, the data structure 400 may include three high level portions: base (first) data fields 402, entity specific (second) data fields 404, and customizable (third) data fields 406. The base data fields may be used by the ESB 102 to manage a data object over its lifecycle. It allows the ESB and associated functionality to uniquely identify an entity, manage its historical states as well as the channel on which it should be shared, e.g., which group of applications and which share group(s). The base data fields 402 may include fields such as, for example, Universal ID (UUID) (e.g., first identification field used to uniquely identify an object in a given state), ID (second identification field used to identify lineage or relatedness of the object to another object, such that, e.g., previous versions of a given object will have the same ID but not the same UUID (objects in different states are different objects), Channel ID (the channel, group of data, that the object belongs to), Type (the type of object, e.g, user, project, etc.), Valid From (first timestamp field that records when the object started to be valid), Valid To (second timestamp field that records when the object became invalid or is expected to become invalid, and can be "null" for an object that is valid at the present time and is not scheduled to expire), and Primary Keys (list of attributes to be used to determine whether two sets of data relate to the same object, e.g., email address for a user, object ID, customer ID, event ID, etc.

With further reference to FIG. 4, entity specific data fields 404 (which may also called substantive data fields) of the exemplary data structure may include identifying information directly usable by the applications during the course of their operations and may typically contain substantive attributes that for an object of a given type. Use of the word entity in regard is not a limited reference to a person or company but rather a general reference to an object of any given type, e.g., a project object for a project management application, an account object for an accounting application, a customer object for a customer relationship management application, etc. The entity specific data may provide sufficiently complete and general substantive data to satisfy the needs of a large number of applications. The substantive data fields may include information such as, for example, customer names, customer phone numbers, customer addresses, comments regarding past meetings with particular customers, past and current projects associated with particular customers, purchases associated with particular customers, scheduled follow-up communications for particular customers, accounts payable data for particular customers, accounts receivable information for particular customers, due dates for particular projects, to name a few. The entity specific data 404 of the exemplary data structure 400 may include the substantive object data associated with a variety of data fields that may be pertinent to one or more shared applications or web services. This object data may be any suitable data, e.g., designated according to a structure comprising multiple fields, e.g., Field 1, Field 2, Field 3, etc.

The data structure 400 may also include customizable fields 406 that are initially designated as unallocated, in the sense that no particular substantive object data are predestined to occupy those locations (fields). These fields, illustrated in the example, as Field A, Field B, Field C, etc., may be used as place holder locations that may be automatically and dynamically reconfigured by the ESB 102 at runtime, e.g., by the access layer 104, by renaming and designating these fields as new fields if the data from the app connectors (i.e., data created at an application instance) contains new data of previously unconfigured fields which have not yet been configured in the previous state of the data structure. In this regard, the data structure is extensible. In other words the fields of a data structure describing a given object are not necessarily hard coded in some sort of static data model or database but can be dynamically adjusted and extended during runtime and can be done without requiring bulk data migration or bulk data processing to accommodate the new type of data received from application instances. An additional field block can be added automatically and dynamically at runtime to the data structure by the ESB 102 to accommodate new data fields created by the applications exchanging information for a given channel. For example, this can provide a desirable technical advantage whereby applications may add custom fields to the data structure, e.g., for additional substantive data, to provide for enhanced flexibility to satisfy the ultimate needs of the end users, and the associated ESB-side data structures are defined such that they can be created, managed and manipulated by the ESB 102 at runtime without the need for bulk data processing or migration. As such, this type of exemplary data structure may provide a technical advantage of avoiding a need to design and create new hard coded data structures and/or conversion interfaces when existing data structures become outdated or obsolete. Additionally, this customizable data structure, whose fields may be dynamically changed by applications, may provide a technical advantage of reducing the amount of data to be transferred and reducing the needed bandwidth during updates, for example, since even for newly customized fields, the entire updated object need not be sent to the participating applications in connection with the update.

Figure 5:
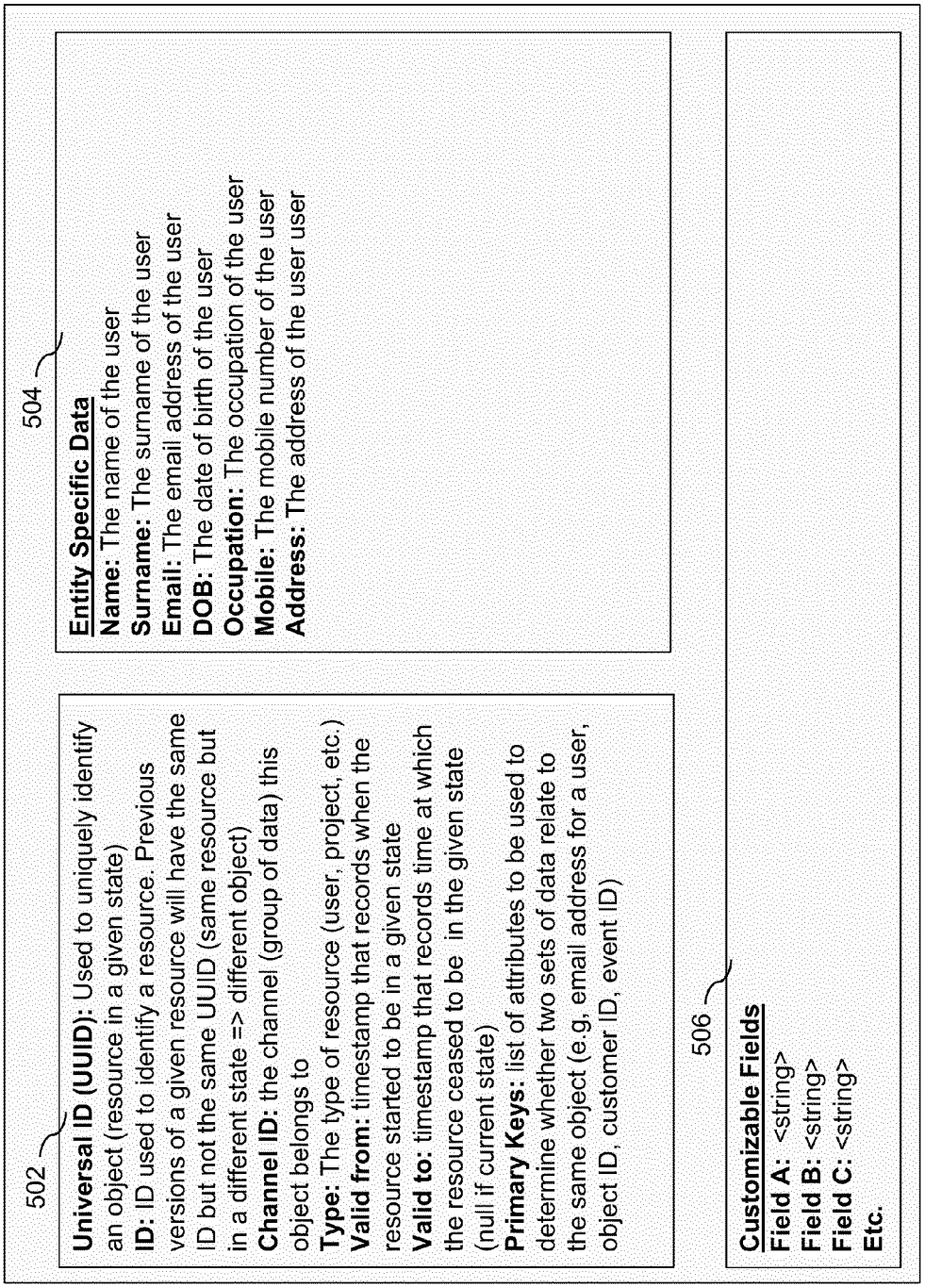
FIG. 5 illustrates a specific example of a data structure for a user object according to the example of FIG. 4.

FIG. 5 illustrates an example of a data structure 500 for a user data object that identifies user data. In this regard, the exemplary data structure 500 may include three high level portions: base data fields 502, entity specific data fields 504, and customizable data fields 506, such as described in connection with FIG. 4. In this example, the entity specific data 504 may includes fields such as, for example: Name (the name of the user), Surname (the surname of the user), Email (the email address of the user running an application instance who created and/or most recently updated the object, DOB (the date of birth of the user), Occupation (the occupation of the user), Mobile (the mobile number of the user), and Address (the address of the user). Other fields for portions 502 and 506 may be configured such as described in connection with FIG. 4.

FIGS. 6A and 6B illustrate further exemplary aspects of an exemplary data structure like that in FIGS. 4 and 5 where the data object itself is a user object, e.g., an employee object, that provides user identifying information. In this regard, not all of the fields shown in FIGS. 4 and 5 are reproduced in FIGS. 6A and 6B. As shown in FIG. 6A, the data model 602 for the data structure may contain contains various fields, e.g.: Name, Surname, Email, DOB, Occupation, Valid From, and Valid To, such as described previously in connection with FIGS. 4 and 5. FIG. 6B shows two different resources 604 and 606 of that data object, i.e., two different instances of that data object, each of which is valid over different periods of time. This example reflects that it may be desirable to maintain data objects that reflect states of the associated data over different time periods. In the example of FIG. 6B, the two separate resources are both user objects for the identifying information about John Doe, but they reflect different occupations at different times, and thus each object is valid over a different time period. As such the two instances shown in the example of FIG. 6B are different resources (data objects) and would have different UUIDs, which uniquely identify an object (resource) in a given state.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, modulated carrier waves, wireless networks, etc. for communication with one or more data processing devices. The data signals can carry any or all of the data disclosed herein that is provided to or from a device.

Data (e.g., associations, mappings, data input, data output, intermediate data results, final data results, etc.) associated with the systems and methods described herein may be stored and implemented in one or more different types of computer-implemented data stores, such as different types of storage devices and programming constructs (e.g., RAM, ROM, flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Other exemplary examples are set forth in the following sets of examples A-D.

Example Set A (A1) A computer-implemented method for updating and distributing data objects among multiple client applications, comprising: receiving at a processing platform object data for an object from a first application instance of an application engine, wherein the object data reflects a change to a state of the object based on action of the first application instance; updating a data structure for the object in a database using a processing system at the processing platform based on the received object data; determining with the processing system whether a transformation policy is applicable to the object and, if so, modifying data associated with the object with the processing system at the processing platform according to the transformation policy; identifying with the processing system application instances that should receive updated object data for the object based on stored information identifying clients that have agreed to share updated object data and based on stored information identifying types of updates that clients are to receive; and communicating updated object data to the application instances that should receive updated object data according to stored preferences associated with each the application instances.

(A2) The method of one or more A examples, wherein the application engine is under control of a first entity, and wherein said communicating updated object data comprises communicating updated object data to an application instance at a cloud service platform under control of a second entity, the second entity being different that the first entity and not under control of the first entity.

(A3) The method of one or more A examples, wherein the application engine is under the control of a first entity, the method comprising receiving data for the object from one or more web services under control of a third entity, the third entity being different from the first entity and the second entity and not under control of either the first entity or second entity.

(A4) The method of one or more A examples, wherein the application engine and the processing platform are under control of the same entity.

(A5) The method of one or more A examples, comprising automatically generating a new data field for the data structure with the processing system if the object data received from the first application includes new data for which a new data field is desired.

(A6) The method of one or more A examples, comprising monitoring demand for computer resources at the application engine and adding or dropping computer resources at the application engine based on demand.

(A7) The method of one or more A examples, comprising monitoring demand for computer resources including data management services at the processing platform and adding or dropping computer resources at the processing platform based on demand.

(A8) The method of one or more A examples, wherein the processing platform comprises an enterprise service bus.

(A9) The method of one or more A examples, comprising determining a cost of application services provided to a customer via the application engine on either an hourly, daily, or monthly basis per application.

(A10) The method of one or more A examples, comprising determining a cost of data management services provided to the customer via the processing platform on either an hourly, daily, or monthly basis per application.

(A11) The method of one or more A examples, comprising determining whether any data corruption impacting objects has occurred, and if so, reverting the objects back to their states prior to the corruption, and reapplying and retransmitting any previously transmitted object updates to remedy the corruption of the objects.

Example Set B (B1) A system for updating and distributing data objects among multiple client applications, comprising: a processing system; and a memory coupled to the processing system, wherein the processing system is configured to execute steps comprising: receiving at a processing platform object data for an object from a first application instance of an application engine, wherein the object data reflects a change to a state of the object based on action of the first application instance; updating a data structure for the object in a database at the processing platform based on the received object data; determining whether a transformation policy is applicable to the object and, if so, modifying data associated with the object at the processing platform according to the transformation policy; application instances that should receive updated object data for the object based on stored information identifying clients that have agreed to share updated object data and based on stored information identifying types of updates that clients are to receive; communicating updated object data to the application instances that should receive updated object data according to stored preferences associated with each the application instances.

(B2) The system of one or more B examples, wherein the application engine is under control of a first entity, and wherein said communicating updated object data comprises communicating updated object data to an application instance at a cloud service platform under control of a second entity, the second entity being different that the first entity and not under control of the first entity.

(B3) The system of one or more B examples, wherein the application engine is under the control of a first entity, the processing system configured to receive data for the object from one or more web services under control of a third entity, the third entity being different from the first entity and the second entity and not under control of either the first entity or second entity.

(B4) The system of one or more B examples, wherein the application engine and the processing platform are under control of the same entity.

(B5) The system of one or more B examples, wherein the processing system is configured to automatically generate a new data field for the data structure if the object data received from the first application includes new data for which a new data field is desired.

(B6) The system of one or more B examples, wherein the processing system is configured to monitor demand for computer resources at the application engine, and wherein the application engine is configured to add or drop computer resources at the based on demand.

(B7) The system of one or more B examples, wherein the processing system is configured to monitor demand for computer resources including data management services at the processing platform and add or drop computer resources at the processing platform based on demand.

(B8) The system of one or more B examples, wherein the processing platform comprises an enterprise service bus.

(B9) The system of one or more B examples, wherein the application engine is configured to determine a cost of application services provided to a customer on either an hourly, daily, or monthly basis per application.

(B10) The system of one or more B examples, wherein the processing system at the processing platform is configured to determine a cost of data management services provided to the customer on either an hourly, daily, or monthly basis per application.

(B11) The system of one or more B examples, wherein the processing system is configured to determine whether any data corruption impacting objects has occurred, and if so, revert the objects back to their states prior to the corruption, and reapplying and retransmit any previously transmitted object updates to remedy the corruption of the objects.

Example Set C (C1) An article of manufacture comprising a non-transitory computer readable medium including program instructions for updating and distributing data objects among multiple client applications, the program instructions which when executed causing a processing system to execute steps comprising: receiving at a processing platform object data for an object from a first application instance of an application engine, wherein the object data reflects a change to a state of the object based on action of the first application instance, updating a data structure for the object in a database using a processing system at the processing platform based on the received object data, determining with the processing system whether a transformation policy is applicable to the object and, if so, modifying data associated with the object with the processing system at the processing platform according to the transformation policy, identifying with the processing system application instances that should receive updated object data for the object based on stored information identifying clients that have agreed to share updated object data and based on stored information identifying types of updates that clients are to receive, and communicating updated object data to the application instances that should receive updated object data according to stored preferences associated with each the application instances.

(C2) The article of manufacture of one or more C examples, wherein the application engine is under control of a first entity, and wherein said communicating updated object data comprises communicating updated object data to an application instance at a cloud service platform under control of a second entity, the second entity being different that the first entity and not under control of the first entity.

(C3) The article of manufacture of one or more C examples, wherein the application engine is under the control of a first entity, the processing system configured to receive data for the object from one or more web services under control of a third entity, the third entity being different from the first entity and the second entity and not under control of either the first entity or second entity.

(C4) The article of manufacture of one or more C examples, wherein the application engine and the processing platform are under control of the same entity.

(C5) The article of manufacture of one or more C examples, the processing system configured to automatically generate a new data field for the data structure if the object data received from the first application includes new data for which a new data field is desired.

(C6) The article of manufacture of one or more C examples, wherein the processing system is configured to monitor demand for computer resources at the application engine, and wherein the application engine is configured to add or drop computer resources at the based on demand.

(C7) The article of manufacture of one or more C examples, wherein the processing system is configured to monitor demand for computer resources including data management services at the processing platform and add or drop computer resources at the processing platform based on demand.

(C8) The article of manufacture of one or more C examples, wherein the processing platform comprises an enterprise service bus.

(C9) The article of manufacture of one or more C examples, wherein the application engine is configured to determine a cost of application services provided to a customer on either an hourly, daily, or monthly basis per application.

(C10) The article of manufacture of one or more C examples, wherein the processing system at the processing platform is configured to determine a cost of data management services provided to the customer on either an hourly, daily, or monthly basis per application.

(C11) The article of manufacture of one or more C examples, wherein the processing system is configured to determine whether any data corruption impacting objects has occurred, and if so, revert the objects back to their states prior to the corruption, and reapplying and retransmit any previously transmitted object updates to remedy the corruption of the objects.

Example Set D (D1) A system for updating and distributing data objects among multiple client applications, comprising: means for receiving object data for an object from a first application instance of an application engine, wherein the object data reflects a change to a state of the object based on action of the first application instance; means for updating a data structure for the object based on the received object data; means for determining whether a transformation policy is applicable to the object and, if so, modifying data associated with the object according to the transformation policy; means for identifying application instances that should receive updated object data for the object based on stored information identifying clients that have agreed to share updated object data and based on stored information identifying types of updates that clients are to receive; and means for communicating updated object data to the application instances that should receive updated object data according to stored preferences associated with each the application instances.

(D2) The system of one or more D examples, wherein the application engine is under control of a first entity, comprising means for communicating updated object data to an application instance at a cloud service platform under control of a second entity, the second entity being different that the first entity and not under control of the first entity.

(D3) The system of one or more D examples, wherein the application engine is under the control of a first entity, comprising means for receiving data for the object from one or more web services under control of a third entity, the third entity being different from the first entity and the second entity and not under control of either the first entity or second entity.

(D4) The system of one or more D examples, wherein the means for receiving, the means for updating, the means for determining, the means for identifying, and the means for communicating are integrated at a common processing platform, and wherein the application engine and the processing platform are under control of the same entity.

(D5) The system of one or more D examples, comprising means for automatically generating a new data field for the data structure with the processing system if the object data received from the first application includes new data for which a new data field is desired.

(D6) The system of one or more D examples, comprising means for monitoring demand for computer resources at the application engine and adding or dropping computer resources at the application engine based on demand.

(D7) The system of one or more D examples, comprising means for monitoring demand for computer resources including data management services and means for adding or dropping computer resources based on demand.

(D8) The system of one or more D examples, wherein the means for receiving, the means for updating, the means for determining, the means for identifying, and the means for communicating are integrated at a common processing platform configured as an enterprise service bus.

(D9) The system of one or more D examples, comprising means for determining a cost of application services provided to a customer via the application engine on either an hourly, daily, or monthly basis per application.

(D10) The system of one or more D examples, comprising determining a cost of data management services provided to the customer on either an hourly, daily, or monthly basis per application.

(D11) The system of one or more D examples, comprising means for determining whether any data corruption impacting objects has occurred, and means for reverting the objects back to their states prior to the corruption and means for reapplying any previously transmitted object updates to remedy the corruption of the objects.

Example Set E (E1) A system for updating and distributing data objects among multiple client applications, especially adapted to carry out a method according to one or more A examples and/or useable in a method according to one or more A examples, comprising: means for receiving object data for an object from a first application instance of an application engine, wherein the object data reflects a change to a state of the object based on action of the first application instance; means for updating a data structure for the object based on the received object data; means for determining whether a transformation policy is applicable to the object and, if so, modifying data associated with the object according to the transformation policy; means for identifying application instances that should receive updated object data for the object based on stored information identifying clients that have agreed to share updated object data and based on stored information identifying types of updates that clients are to receive; and means for communicating updated object data to the application instances that should receive updated object data according to stored preferences associated with each the application instances.

(E2) A system for updating and distributing data objects among multiple client applications, especially adapted to carry out a method according to one or more A examples and/or useable in a method according to one or more A examples, comprising: a processing system; and a memory coupled to the processing system, wherein the processing system is configured to execute steps including receiving at a processing platform object data for an object from a first application instance of an application engine, wherein the object data reflects a change to a state of the object based on action of the first application instance, updating a data structure for the object in a database using a processing system at the processing platform based on the received object data, determining with the processing system whether a transformation policy is applicable to the object and, if so, modifying data associated with the object with the processing system at the processing platform according to the transformation policy, identifying with the processing system application instances that should receive updated object data for the object based on stored information identifying clients that have agreed to share updated object data and based on stored information identifying types of updates that clients are to receive, and communicating updated object data to the application instances that should receive updated object data according to stored preferences associated with each the application instances.

Example Set F (F1) A computer program product including program instructions adapted to carry out steps for updating and distributing data objects among multiple client applications, especially according to a method of according to one or more A examples, the program instructions which when executed causing a processing system, especially a system according to one or more B examples, to execute steps comprising: receiving at a processing platform object data for an object from a first application instance of an application engine, wherein the object data reflects a change to a state of the object based on action of the first application instance, updating a data structure for the object in a database using a processing system at the processing platform based on the received object data, determining with the processing system whether a transformation policy is applicable to the object and, if so, modifying data associated with the object with the processing system at the processing platform according to the transformation policy, identifying with the processing system application instances that should receive updated object data for the object based on stored information identifying clients that have agreed to share updated object data and based on stored information identifying types of updates that clients are to receive, and communicating updated object data to the application instances that should receive updated object data according to stored preferences associated with each the application instances.

Example Set G (G1) A data structure for a data object that permits facilitating updates and distribution of data objects among multiple client applications in a computer network, the data structure comprising: a plurality of first data fields including a first identification field to uniquely identify an object, a second identification field to identify lineage or relatedness of the object to another object, a type field that identifies a type of the object, a first timestamp field that specifies when the object started to be valid, and a second timestamp field that specifies when the object became or is expected to become invalid; a plurality of second data fields to identify substantive data regarding a customer or a project for the object; and a plurality of third data fields that are customizable and configured in an initial state to be unallocated such that no particular type of object data is predestined to occupy the third data fields, the third data fields being dynamically reconfigurable during runtime to accommodate new data from one or more applications, wherein the third data fields are not coded according to a static data model.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. It should also be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise.

While exemplary embodiments have been shown and described herein, it will be appreciated by those skilled in the art that such embodiments are provided by way of example only. It is intended that the following claims define the scope of the invention and that methods and structures within the scope of these claims and their equivalents be covered thereby.

Any discussion of documents, acts, materials, devices, articles or the like which has been included in the present specification is not to be taken as an admission that any or all of these matters form part of the prior art base or were common general knowledge in the field relevant to the present invention as it existed before the priority date of each claim of this application.

What is claimed is:

1. A computer-implemented method for updating and distributing data objects among multiple client applications, comprising:
   receiving at a processing platform object data for an object from a first application instance of an application engine, wherein the object data reflects a change to a state of the object based on action of the first application instance;
   updating a data structure for the object in a database using a processing system at the processing platform based on the received object data;
   determining with the processing system whether a transformation policy is applicable to the object and, if so, modifying data associated with the object with the processing system at the processing platform according to the transformation policy;
   identifying with the processing system application instances that should receive updated object data for the object based on stored information identifying clients that have agreed to share updated object data and based on stored information identifying types of updates that clients are to receive; and
   communicating updated object data to the application instances that should receive updated object data according to stored preferences associated with each the application instances.

2. The method of claim 1, wherein the application engine is under control of a first entity, and wherein said communicating updated object data comprises communicating updated object data to an application instance at a cloud service platform under control of a second entity, the second entity being different that the first entity and not under control of the first entity.

3. The method of claim 1, wherein the application engine is under the control of a first entity, the method comprising receiving data for the object from one or more web services under control of a third entity, the third entity being different from the first entity and the second entity and not under control of either the first entity or second entity.

4. The method of claim 1, wherein the application engine and the processing platform are under control of the same entity.

5. The method of claim 1, comprising automatically generating a new data field for the data structure with the processing system if the object data received from the first application includes new data for which a new data field is desired.

6. The method of claim 1, comprising monitoring demand for computer resources at the application engine and adding or dropping computer resources at the application engine based on demand.

7. The method of claim 1, comprising monitoring demand for computer resources including data management services at the processing platform and adding or dropping computer resources at the processing platform based on demand.

8. The method of claim 1, wherein the processing platform comprises an enterprise service bus.

9. The method of claim 1, comprising determining whether any data corruption impacting objects has occurred, and if so, reverting the objects back to their states prior to the corruption, and reapplying and retransmitting any previously transmitted object updates to remedy the corruption of the objects.

10. The method of claim 1, wherein determining with the processing system whether a transformation policy is applicable to the object comprises determining whether the object data includes information that causes the transformation policy to be applicable to the object.

11. A system for updating and distributing data objects among multiple client applications, comprising:
   a processing system; and
   a memory coupled to the processing system, wherein the processing system is configured to execute steps including
   receiving at a processing platform object data for an object from a first application instance of an application engine, wherein the object data reflects a change to a state of the object based on action of the first application instance,
   updating a data structure for the object in a database at the processing platform based on the received object data,
   determining whether a transformation policy is applicable to the object and, if so, modifying data associated with the object at the processing platform according to the transformation policy,
   identifying application instances that should receive updated object data for the object based on stored information identifying clients that have agreed to share updated object data and based on stored information identifying types of updates that clients are to receive, and communicating updated object data to the application instances that should receive updated object data according to stored preferences associated with each the application instances.

12. The system of claim 11, wherein the application engine is under control of a first entity, and wherein said communicating updated object data comprises communicating updated object data to an application instance at a cloud service platform under control of a second entity, the second entity being different that the first entity and not under control of the first entity.

13. The system of claim 11, wherein the application engine is under the control of a first entity, the processing system configured to receive data for the object from one or more web services under control of a third entity, the third entity being different from the first entity and the second entity and not under control of either the first entity or second entity.

14. The system of claim 11, wherein the application engine and the processing platform are under control of the same entity.

15. The system of claim 11, wherein the processing system is configured to automatically generate a new data field for the data structure if the object data received from the first application includes new data for which a new data field is desired.

16. The system of claim 11, wherein the processing system is configured to monitor demand for computer resources at the application engine, and wherein the application engine is configured to add or drop computer resources at the application engine based on demand.

17. The system of claim 11, wherein the processing system is configured to monitor demand for computer resources including data management services at the processing platform and add or drop computer resources at the processing platform based on demand.

18. The system of claim 11, wherein the processing platform comprises an enterprise service bus.

19. The system of claim 11, wherein the processing system is configured to determine whether any data corruption impacting objects has occurred, and if so, revert the objects back to their states prior to the corruption, and reapplying and retransmit any previously transmitted object updates to remedy the corruption of the objects.

20. The system of claim 11, wherein determining whether a transformation policy is applicable to the object comprises determining whether the object data includes information that causes the transformation policy to be applicable to the object.

21. A non-transitory computer readable medium including program instructions for updating and distributing data objects among multiple client applications, the program instructions which when executed causing a processing system to execute steps comprising:

receiving at a processing platform object data for an object from a first application instance of an application engine, wherein the object data reflects a change to a state of the object based on action of the first application instance, updating a data structure for the object in a database at the processing platform based on the received object data, determining whether a transformation policy is applicable to the object and, if so, modifying data associated with the object at the processing platform according to the transformation policy, identifying application instances that should receive updated object data for the object based on stored information identifying clients that have agreed to share updated object data and based on stored information identifying types of updates that clients are to receive, and communicating updated object data to the application instances that should receive updated object data according to stored preferences associated with each the application instances.

22. The non-transitory computer readable medium of claim 21, wherein the application engine is under control of a first entity, and wherein said communicating updated object data comprises communicating updated object data to an application instance at a cloud service platform under control of a second entity, the second entity being different that the first entity and not under control of the first entity.

23. The non-transitory computer readable medium of claim 21, wherein the application engine is under the control of a first entity, the processing system configured to receive data for the object from one or more web services under control of a third entity, the third entity being different from the first entity and the second entity and not under control of either the first entity or second entity.

24. The non-transitory computer readable medium of claim 21, wherein the application engine and the processing platform are under control of the same entity.

25. The non-transitory computer readable medium of claim 21, the processing system configured to automatically generate a new data field for the data structure if the object data received from the first application includes new data for which a new data field is desired.

26. The non-transitory computer readable medium of claim 21, wherein the processing system is configured to monitor demand for computer resources at the application engine, and wherein the application engine is configured to add or drop computer resources at the based on demand.

27. The non-transitory computer readable medium of claim 21, wherein the processing system is configured to monitor demand for computer resources including data management services at the processing platform and add or drop computer resources at the processing platform based on demand.

28. The non-transitory computer readable medium of claim 21, wherein the processing platform comprises an enterprise service bus.

29. The non-transitory computer readable medium of claim 21, wherein the processing system is configured to determine whether any data corruption impacting objects has occurred, and if so, revert the objects back to their states prior to the corruption, and reapplying and retransmit any previously transmitted object updates to remedy the corruption of the objects.

30. The non-transitory computer readable medium of claim 21, wherein determining whether a transformation policy is applicable to the object comprises determining whether the object data includes information that causes the transformation policy to be applicable to the object.

* * * * *